Aug. 6, 1968  F. L. B. MILLER  3,395,741
WOOD SAWS
Filed May 20, 1966  2 Sheets-Sheet 1
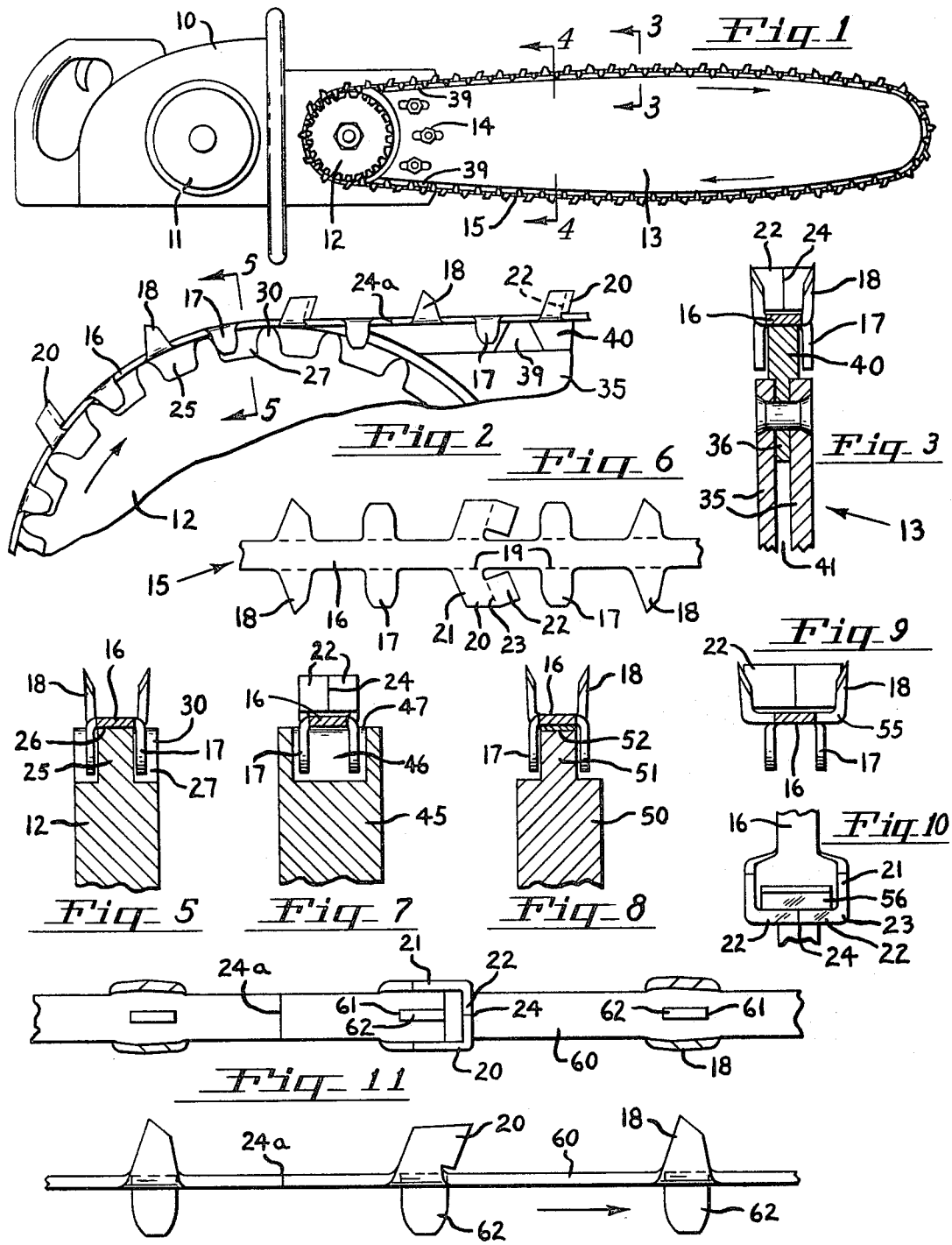
INVENTOR.
FREDERICK L. B. MILLER
BY
Attorney Aug. 6, 1968  F. L. B. MILLER  3,395,741
WOOD SAWS
Filed May 20, 1966  2 Sheets-Sheet 2
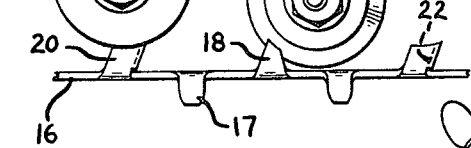
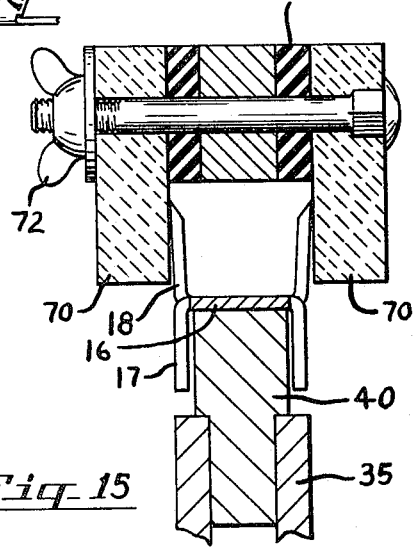
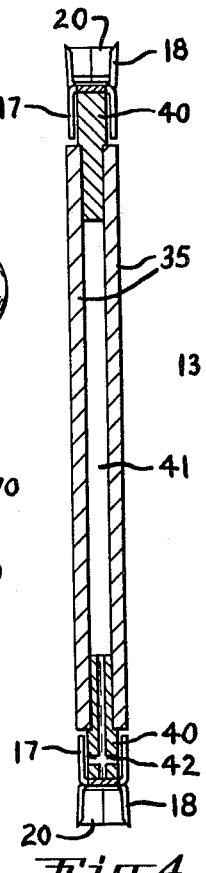
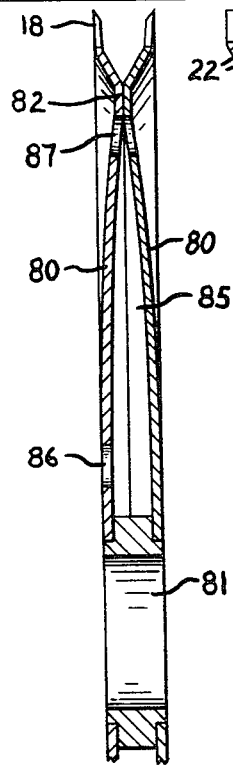
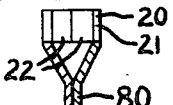
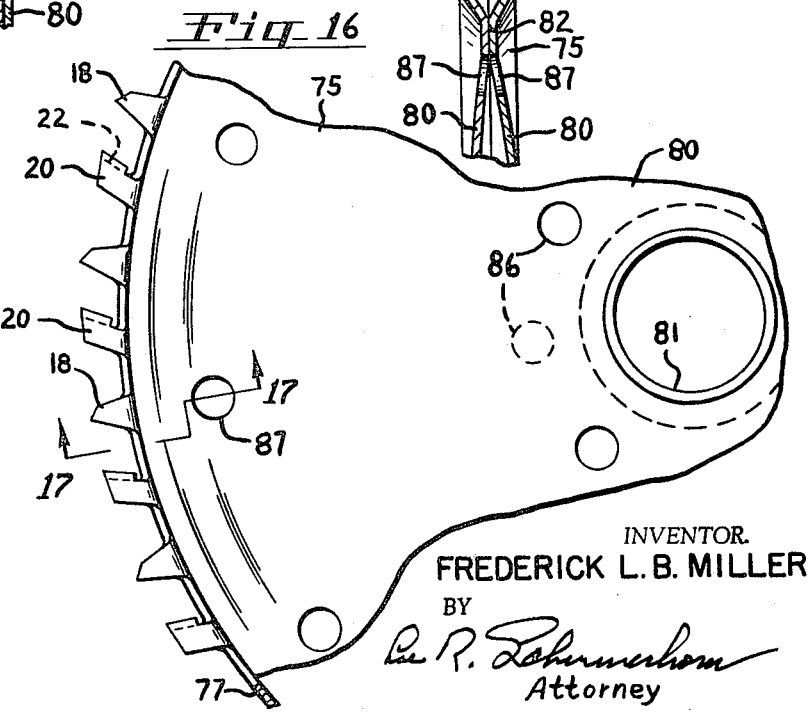
INVENTOR.
FREDERICK L. B. MILLER
BY
Attorney United States Patent Office 3,395,741
Patented Aug. 6, 1968

3,395,741
WOOD SAWS
Frederick L. B. Miller, 17353 SW. Canal Circle,
Lake Oswego, Oreg. 97034
Filed May 20, 1966, Ser. No. 551,645
11 Claims. (Cl. 143—133)

ABSTRACT OF THE DISCLOSURE

The saw has a succession of scoring teeth and chisel bit teeth, the latter having wing portions bent transversely from the leading edges of opposite side portions to cut a long fiber chip in cross cut sawing and eliminate sawdust. The teeth are formed on a stamped metal blank. The blank may comprise a long strip to form a band saw for use on a chain saw blade. The strip may be mounted on a wheel to form a circular saw. Also, two stamped circular blanks may be united to form a circular saw.

---

This invention relates to improvements in wood saws. The invention may be embodied in a band saw somewhat resembling a conventional chain saw and it may also be embodied in a circular saw.

Chain saws have proved highly successful because of their convenience and rapid cutting action. The saw chains for such saws are, however, quite expensive to manufacture, being made from a large number of small parts, and are quite difficult to sharpen properly. Another objection which is common to all types of conventional saws is that they produce a sawdust of little or no commercial value whereby a considerable amount of valuable wood is either wasted or reduced to a low grade product.

An object of the invention is, therefore, to provide a saw having the utility and advantages of a chain saw but which is more simple and inexpensive to manufacture and is easier to sharpen. Another object is to make a saw band in one piece which is functionally equivalent to a saw chain assembled from many pieces. Another object is to provide saws which will cut chips having a fiber length acceptable as pulp chips to the pulp and paper industry whereby the by-product of the saws will have a greatly enhanced value and less wood will be wasted.

Other objects are to provide improvements which may be embodied in both band and circular saws, to provide a band saw in which the active cutting portion is disposed in a plane perpendicular to the plane of the kerf instead of parallel with the kerf, and to provide band and circular saws which may be constructed to cut narrow or wide kerfs as desired.

The features of the invention may be embodied in a band saw which may be used on the saw bar of a conventional chain saw or on a modified saw bar to serve the same purpose as a chain saw. Various types of teeth, including chisel bit teeth, are formed in outstanding position from one face of the band so that the band advances flatwise through the wood, cutting a kerf of a width equal to the width of the saw band. Similar teeth are formed on circular saws to cut a kerf of desired width. In any case, the saw may be constructed to form a narrow kerf for cutting sawdust or a wide kerf corresponding to the fiber length desired for pulp chips. In order to make the chips acceptable for pulp chips, the present wide kerf saws would be used in equipment which cuts across the grain such as trimmers, slashers, log bucking saws and the like.

The invention will be better understood and additional objects and advantages will become apparent from the following detailed description of certain preferred embodiments illustrated in the accompanying drawings. Various changes may be made, however, in the details of construction and arrangement of parts and certain features may be used without others. All such modifications within the scope of the appended claims are included in the invention.

In the drawings:

FIGURE 1 is a side elevation view showing a chain saw having a modified saw bar equipped with a band saw embodying the principles of the invention;

FIGURE 2 is a fragmentary enlarged view of a portion of FIGURE 1;

FIGURE 3 is an enlarged view taken on the line 3—3 in FIGURE 1;

FIGURE 4 is an enlarged view on the line 4—4 in FIGURE 1, showing lubrication means in the saw bar;

FIGURE 5 is an enlarged view taken on the line 5—5 in FIGURE 2;

FIGURE 6 is a plan view of the blank used in making the band saw in FIGURES 1 to 5;

FIGURE 7 is a view similar to FIGURE 5 showing a different type of sprocket wheel;

FIGURE 8 is a view similar to FIGURE 5, showing a pulley-type drive wheel instead of a sprocket;

FIGURE 9 is a cross sectional view of a modified form of saw band for cutting chips having a longer fiber;

FIGURE 10 is a fragmentary top plan view of a saw band having extended width chisel teeth with reinforcement;

FIGURE 11 is a top plan view of a modified form of saw band;

FIGURE 12 is a side elevation view of the saw band in FIGURE 11;

FIGURE 13 is a fragmentary elevation view showing saw sharpening means;

FIGURE 14 is a side elevation view of one of the grinding wheels in FIGURE 13;

FIGURE 15 is a fragmentary cross sectional view showing dressing means for the scoring teeth;

FIGURE 16 is a fragmentary view of a circular saw embodying the features of the invention;

FIGURE 17 is a view on the line 17—17 in FIGURE 16;

FIGURE 18 is a fragmentary sectional view similar to FIGURE 17, showing a modification; and FIGURE 19 is a fragmentary view showing the form of chisel teeth in the modification of FIGURE 18.

FIGURE 1 illustrates a chain saw which has been modified to incorporate the principles of the invention. The handle portion 10 is equipped with an electric motor 11, or internal combustion engine, arranged to rotate the drive sprocket 12. A saw bar 13 is adjustably mounted on the handle portion by means of studs and nuts 14. Instead of the conventional saw chain, the saw bar carries a novel form of band saw 15 which will also be referred to as the saw band.

Saw band 15 is stamped from a flat steel strip to form a blank as shown in FIGURE 6. This blank has a continuous center strip 16 with oppositely directed projections which are bent to provide drive lugs and teeth. The projections 17 are bent downward perpendicular to strip 16 to provide drive lugs. Preferably, these lugs are spaced apart a distance equal to twice the pitch of the teeth on drive sprocket 12 so that the lugs will engage alternate teeth as shown in FIGURE 2. The sprocket wheel has an odd number of teeth whereby the lug-engaging teeth in one revolution will fall between the lugs on the next revolution in order to reduce the wear on the teeth.

Projections 18 are bent upward to form pairs of scoring teeth and projections 20 are bent upward to form chisel teeth. The bend lines for the lugs and teeth are indicated at 19. The chisel teeth have side portions 21 extending longitudinally of the band and wing portions 22 which are bent on the lines 23 to extend transversely across the band as shown in FIGURE 3. Each pair of projections 20 thereby forms a single chisel tooth. The abutting ends of wing tips 22 may be welded together at 24, if desired. The band is cut to proper length and the ends are welded together as shown at 24a in FIGURE 2 to form a closed loop.

Sprocket wheel 12 is formed with a continuous cylindrical mid porition 25 which has a pulley surface 26 to support the strip portion 16 of the band as shown in FIGURE 5. On opposite sides of pulley portion 25 are recesses 27 between the teeth 30 to receive the lugs 17 whereby the pairs of lugs straddle the pulley portion 25.

FIGURE 3 shows the construction of saw bar 13. Two flat plates 35 are riveted or welded on opposite sides of the tongue 36 of a guide bar 40 which extends beyond the edges of the plates. Central strip 16 of the saw band rides on the edge of the guide bar and the drive lugs 17 straddle the guide bar. Thus, the two parts 35 and 40 may be made of different grades of steel best suited for the different conditions to which these parts are subjected. The essential requirements of guide bar 40 are low friction and good wearing properties. On the other hand, the plates 35 are not subject to wear but require strength and toughness. Guide bar 40 is notched at 39 for cleaning the face of the band which rides on the guide bar and sprocket pulley portion.

This form of construction of the saw bar allows an open space 41 between the plates 35 which reduces the weight of the saw bar and provides a reservoir for lubricating oil. As shown in FIGURE 4, the guide bar 40 is provided with vertical and horizontal oil passages 42 on the underside of the saw bar which communicate with reservoir 41. These passages are filled with wick material to feed oil to the bottom and side surfaces of the guide bar which are wiped by the saw band. A suitable filler opening, not shown, is provided to introduce oil into the reservoir 41.

FIGURE 7 shows a modified form of sprocket wheel 45 having interior pockets 46 for the lugs 17 between the teeth 47. In this case, the center strip 16 rides on the ends of the teeth.

FIGURE 8 shows another form of driving wheel 50 without sprocket teeth. A central cylindrical pulley portion 51 is provided with a friction surface 52 of rubber or other suitable material for driving the band. Lugs 17 straddle the pulley portion 51 whereby the same band 15 may be used on the three different drive wheels 12, 45 and 50.

The band has the same width as a conventional saw chain for the same size of saw bar. An important feature of the invention, now to be described, is a saw band for cutting a wider kerf.

FIGURE 9 shows a saw band having extended width teeth for cutting long fibered chips suitable for pulp chips. In this case, the projections 21 are not bent upward on the lines 19 at the edges of center strip 16 but continue laterally in the plane of strip 16 for a distance and are then bent upward at 55. The scoring teeth 18 are bent in a similar manner. FIGURE 10 is a top plan view of the chisel tooth in FIGURE 9 with reinforcement 56 added. The reinforcement comprises a steel plate spot welded to the transverse wings 22. When cutting across the grain, the transverse distance between the scoring teeth determines the fiber length of the chips.

Still another form of saw band is shown in FIGURES 11 and 12. The band 60 has scoring teeth 18 and chisel teeth 20 formed in the manner described in connection with FIGURES 2, 3 and 6. In this case, the band is punched with rectangular openings 61 on the center line of the band and driving lugs 62 are welded or swaged in these openings. The ends of the band are flash welded together at joint 24a to form a closed loop. The center line position of the driving lugs permits this saw band to be used in place of the conventional chain on a chain saw having the usual grooved edge saw bar. Lugs 62 travel in the groove in the same manner as the driving lugs on a saw chain. A sprocket wheel of the type shown in FIGURE 7 may be used.

FIGURE 13 shows very simple and convenient means for sharpening the various band saws just described. The transverse cutting edges of chisel teeth 20 are ground on their rear sides by a cylindrical grinding wheel 65. The inside edges of scoring teeth 18 are ground by a grinding wheel 66 having conical working surfaces 67 as shown in FIGURE 14. The wheel 66 may be made in two parts which are adjustable axially toward and away from each other for use on scoring teeth of different lateral spacing. These grinding operations are of such a simple nature that they may be carried out without removing the band from the saw bar, if desired.

After sharpening the teeth as described in connection with FIGURE 13, the outer sides of the scoring teeth 18 may be dressed with the stationary stones 70 as shown in FIGURE 15 to remove burrs formed during sharpening. The chain, while mounted on the saw bar, is merely driven between the stones in the manner shown. Resilient rubber washers 71 permit the stones to be drawn closer together by tightening nuts 72 so that the stones will engage the teeth as the teeth become shorter from repeated sharpening. The scoring teeth preferably have a slight flare or divergence as shown. A small amount of set (additional outward flare at the tips) may also be necessary to provide adequate clearance in the kerf and more effective jointing (dressing to a common width).

An advantage of the present form of band saw construction, however, is that the saw band is so inexpensive it may be discarded when dull instead of being resharpened.

The principles of the invention may also be applied to circular saws. FIGURES 16 and 17 show a wheel 75 in the shape of a pulley having a cylindrical peripheral surface at 76. A circular saw band 77 is shrunk on the surface 76. Saw band 77 is formed in the same manner as any of the previously described saw bands except that driving lugs 17 or 62 are omitted.

The wheel 75 is formed of two dished discs 80 equipped with a suitable driving hub 81 for mounting on a shaft. The discs are welded together at 82 around a circle a short distance inward from their periphery. The dished shape of the discs provides an interior chamber 85 for water cooling. Holes 86 near the hub provide for the introduction of water and holes 87 near the periphery form water outlets. Suitable means, not shown, are provided for conveying the cooling water to the inlet holes 86.

FIGURES 18 and 19 show a similar circular saw in which the scoring teeth and chisel teeth are formed integrally with the wheel. Peripheral portions of the discs 80 are spaced apart and the discs are stamped to form tooth blanks of the shapes shown at 18 and 20 on one side of the blank in FIGURE 6. Thus, the projections 18 in FIGURE 18 form scoring teeth and the projections 20 in FIGURE 19 have wing portions 22 which are bent on fold lines 23 (FIGURE 6) to form chisel bit teeth. Half of each chisel tooth is formed in one disc 80 and the other half is formed in the opposite disc whereby the two halves mate together as shown in FIGURE 19 to form a complete chisel tooth. The plane of the view in FIGURE 18 is just behind a pair of scoring teeth as in FIGURE 17 and the plane of the view in FIGURE 19 is just behind a chisel tooth, looking in the direction of rotation.

The circular saws just described may be formed to cut either short fiber or long fiber chips, as desired, when used as crosscut saws. These saws may be sharpened conveniently by the grinding wheels and dressing stones shown in FIGURES 13 to 15 the same as the band saws or they may be discarded without re-sharpening in view of their low cost form of construction. The double disc, shaped side members provide for expansion without distortion at any speed and eliminate the need for the conventional type of dishing and constant speed operation.

Having now described my invention and in what manner the same may be used, what I claim as new and desire to protect by Letters Patent is:

1. A saw band comprising a single continuous flat strip of metal having its ends secured in abutting relation to form a closed loop; pairs of scoring teeth disposed opposite to each other at intervals along said strip, said scoring teeth comprising integral projections on opposite edges of said strip bent to project outward from said loop; and chisel bit teeth at intervals between said pairs of scoring teeth, each chisel bit tooth comprising a pair of integral projections on opposite edges of said strip, said projections having tooth side portions adjoining said strip and wing portions adjoining said side portions, said side portions being bent to project outward from said loop in parallel relation to each other and said wing portions being bent toward each other to extend transversely across the width of said strip.

2. A saw band as defined in claim 1, said wing portions being welded to each other.

3. A saw band as defined in claim 1 including driving lugs on said strip projecting inward of said loop.

4. A saw band as defined in claim 3, said lugs comprising integral projections bent inward from said strip.

5. A saw band as defined in claim 3, said lugs being separate parts welded on said strip.

6. A saw band as defined in claim 5, said lugs being mounted in the center of said strip.

7. In a saw, a succession of scoring teeth and chisel teeth comprising outstanding projections formed on the body of the saw, said scoring teeth being arranged in pairs to cut opposite sides of a kerf simultaneously, said chisel tooth projections being arranged in pairs with opposite side portions extending in the direction of travel through the kerf, and wing portions on the leading edges of said side portions, said wing portions being coextensive with said leading edges and bent toward each other in edge-to-edge abutting relation to extend transversely across the kerf.

8. A saw as defined in claim 7, said body of the saw comprising a single stamped metal blank in the form of a flat strip having its ends secured in abutting relation to form a closed loop.

9. A saw as defined in claim 7, said body of the saw comprising a pair of circular stamped metal blanks secured together to form a circular saw.

10. A saw band as defined in claim 1 in combination with a wheel, said band being mounted on the periphery of the wheel to form a circular saw.

11. A circular saw as defined in claim 10, the ends of said band being welded together to form a hoop and said hoop being shrunk on said wheel.

References Cited

UNITED STATES PATENTS

| | | | |
|---|---|---|---|
| 2,962,061 | 11/1960 | Nielsen | 143—32 |
| 3,338,275 | 8/1967 | Ehlen | 143—32 |

FOREIGN PATENTS 856,276  12/1960  Great Britain.

DONALD R. SCHRAN, *Primary Examiner.*